April 14, 1959     O. G. FRYKMAN     2,881,868
THERMOSTATIC DAMPER
Filed Dec. 30, 1955
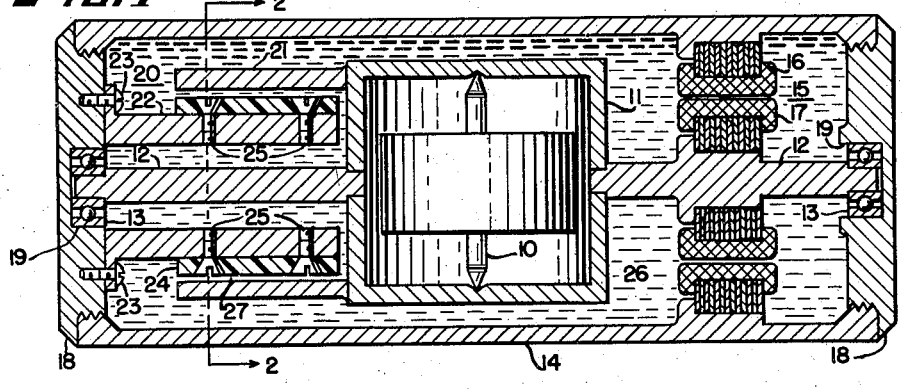
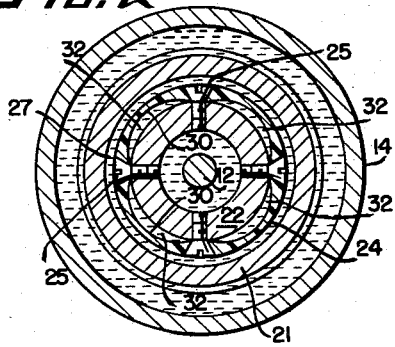 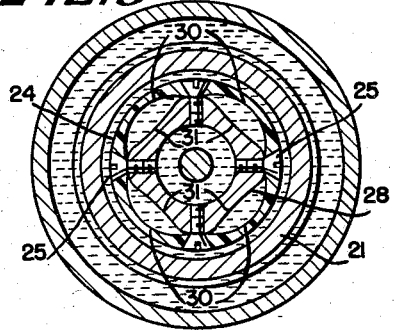
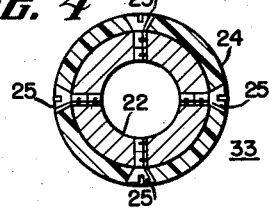 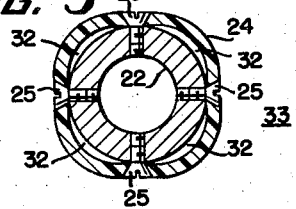
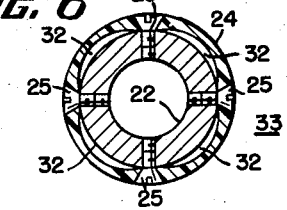
*INVENTOR.*
OSCAR G. FRYKMAN
BY *Roger W. Jensen*
ATTORNEY United States Patent Office 2,881,868
Patented Apr. 14, 1959

2,881,868

THERMOSTATIC DAMPER

Oscar G. Frykman, Edina, Minn., assignor to Minneapolis-Honeywell Regulator Company, Minneapolis, Minn., a corporation of Delaware Application December 30, 1955, Serial No. 556,650

9 Claims. (Cl. 188—90)

My invention relates to an improved fluid damping apparatus which automatically compensates for viscosity changes in a liquid due to temperature variations.

In previous viscous type damping apparatus there has existed a problem of viscosity changes in the damping fluid. This viscosity change in the damping fluid effects the efficiency of the damping system and many methods have been attempted to overcome the deficiencies of the previous systems. Attempts have been made to improve the liquids in the dampers but over a wide temperature range the viscosity still varies considerably. One attempt to improve the overall efficiency of the damping system has been to use heating elements to cause the damping fluid to remain at a constant temperature. However, this adds to the weight, size and complexity of the instrument and is not in general completely satisfactory. Another method to compensate for the fluid viscosity change has been to use dissimilar metals as elements of the dampers, one of which usually has a low coefficient of thermal expansion and the other a high coefficient of thermal expansion. The metal of low coefficient of thermal expansion is usually placed adjacent to the metal of high coefficient of thermal expansion to form a gap and as the damping fluid changes viscosity due to temperature variation, the gap area is changed by expansion and contraction of the metal of high coefficient of thermal expansion. However, this was not a complete solution to the problem as the compensation obtained was not the amount required.

The ideal viscous damper for a sensitive instrument produces a constant damping action regardless of the temperature variations of the damping fluid. My invention is directed toward an improved viscous damper having a unique configuration which compensates for the temperature variations to produce a constant damping action without the aid of heating elements. Another aspect of the invention lies in the use of certain materials to produce a damper providing optimum performance.

It is therefore an object of this invention to improve liquid damping apparatus by providing automatic compensation for viscosity variations due to a change in temperature of the damping fluid.

It is another object of this invention to reveal a process of preparation for the improved liquid damping apparatus to insure that the expansion and contraction of the material is symmetrical and stress free.

These and other features of the invention will be understood more clearly and fully from the following detailed description and accompanying drawing in which:

Figure 1 is a sectional view of a sensitive instrument including my improved damping apparatus.

Figure 2 is a cross-sectional view of the damping apparatus shown in Figure 1 as viewed from section lines 2—2.

Figure 3 is a cross-sectional view of the modified damping apparatus.

Figure 4 is a cross-section of the inner member of the damper shown in Figures 1 and 2, shown at the beginning of the process of preparation.

Figure 5 shows the same view as Figure 4 after thermal cycling.

Figure 6 shows the finished member of the damping apparatus before assembling.

Referring to Figure 1, a sensitive instrument is shown comprising a gyro 10, enclosed in a gimbal or housing 11, and supported by a shaft 12 which is rotatable in bearings 13. A pair of circular end members 18 are fastened by a suitable means such as threads to the ends of cylindrical housing 14. The inner face of each end member 18 has a central recess 19 in which are located the bearings 13. Housing 14 also supports a stator assembly 16 of an electromagnetic error pick-off 15. Shaft 12 supports rotor 17 of the electromagnetic error pick-off 15 and the rotatable or movable member 21 of a damping device 20. The rotatable member 21 is a hollow cylinder attached at one end to the housing 11, with its axis coaxial with the rotational axis of shaft 12 as defined by bearings 13.

The damping device 20 further includes a stationary member 22. The stationary member 22 is a hollow cylinder attached by suitable means such as screws 23 to end member 18 so that it also is coaxial with shaft 12. Hollow cylinder 21 has a larger inner diameter than the outer diameter of the hollow cylinder 22 and the cylindrical members 21 and 22 are coaxially mounted so that the smaller cylinder nests inside the larger cylinder and thereby defines an annular gap. A sleeve 24 is positioned in the annular gap and is attached to hollow cylinder 22 at a plurality of spaced points by suitable means such as screws 25. Sleeve 24 thereby reduces the original annular gap to one of smaller area as designated by numeral 27. Sleeve 24 is made out of material dissimilar from the material of the member to which it is attached for reasons to follow. This method of attaching the dissimilar material 24 may be seen more clearly in Figure 2. The entire mechanism, including the gyro housing 11, the electromagnetic error pick-off 15 and the damper assembly 20, is supported and emerged in a viscous fluid 26 contained in the housing 14. The rotatable member 21 and the stationary cylindrical member 22 with the dissimilar material 24 attached, define an annular gap 27 in which the fluid 26 forms the viscous portion of the liquid damper.

The dissimilar material 24 may be of polytetrafluorethylene or nylon composition. Most of these materials have a relatively high coefficient of linear thermal expansion and expand and contract readily with changes in temperature. Materials of polytetrafluorethylene composition have been found to function exceptionally well and possess the additional quality of having a relatively low hydroscopic property.

In Figure 2 the temperature sensitive material 24 is not of even thickness about its periphery but is thicker at the point where it is attached by screws 25 and becomes thinner at intermediate points 30. This arrangement is due to a special process which will be described later. The temperature sensitive material 24 is attached at four points to give optimum operation of the damper 20.

In operation of the damping apparatus 20, the outer hollow cylindrical member 21 is rotated by the gyro 10 and housing 11. This rotation of the outer cylindrical member 21 is opposed by the damping action of the viscous fluid 26. Under ideal conditions the annular gap 27 would remain constant in cross-sectional area because the viscous fluid 26 would not change its viscosity due to a temperature variation. In my invention, the annular gap 27 is varied in cross-sectional area by the expansion and contraction of the temperature sensitive material 24 as the viscous fluid 26 changes its viscosity due to an ambient temperature change. In other words, as the ambient temperature increases and the viscosity of the fluid 26 decreases, the annular gap 27 is made smaller due to expansion of the temperature sensitive material 24.

This expansion of the temperature sensitive material 24 compensates for the viscosity change in the viscous fluid 26 and approaches the ideal conditions. When the viscous fluid 26 is subjected to colder ambient temperatures, the temperature sensitive material 24 contracts, thereby allowing the annular gap 27 to become larger and compensate for the increase in viscosity of the viscous fluid 26. This type of damping then produces a most efficient damper and a more ideal sensitive instrument.

It is understood that those familiar with the art may vary or modify the present structure of which one modification is shown in Figure 3. In Figure 3, the inner cylindrical member has been recessed longitudinally at the intermediate points 31 between the attaching screws 25. By recessing longitudinally the inner cylindrical member, a cross sectional shape similar to a square or diamond is obtained as designated by numeral 28. The diamond or square cross sectional shape of the inner member 28 will allow the temperature sensitive sleeve 24 to contract further than when placed over the inner cylindrical member 22 as shown in Figures 1 and 2. Due to the recessed member 28, viscosity variation of the fluid 26 over a wider ambient temperature range could be compensated for by increased contraction of the temperature sensitive sleeve 24. It is evident then that the form taken by the sleeve of temperature sensitive material 24 is of vital importance and this will next be described in the process of attaching and machining the sleeve of temperature sensitive material 24.

Referring to Figure 4, the sleeve of temperature sensitive material 24 is first positioned over the inner cylindrical member 22 and attached by screws 25 at four equal points about the periphery to form a complete assembly 33. The method used to attach the sleeve of temperature sensitive material 24 should be such that it prevents cold flow of the sleeve of temperature sensitive material 24. To be more specific, the sleeve of temperature sensitive material 24 should not creep, move, or flow after being attached by screws 25, but should remain concentric with inner cylindrical member 22. The temperature sensitive material is then subjected to thermal cycles including alternate hot and cold temperatures which are outside the ambient temperature range. After subjecting the temperature sensitive material 24 to the thermal cycling process, the temperature sensitive material 24 assumes a four leaf clover shape as shown in Figure 5. The hot and cold cycling also produces a stress free member. The thermal cycle also produces a separation of the temperature sensitive material 24 and the inner cylindrical member 22 at intermediate points 32 between screws 25 about the periphery of the inner cylindrical member 22. The complete assembly 33 is then machined until the outer periphery of the temperature sensitive material 24 is once again cylindrical as seen in Figure 6. This process produces an inner cylindrical assembly 33 which has material of a relatively high coefficient of linear thermal expansion 24 attached at four equal points about the periphery of the inner cylindrical member 22 to give a stress free member and attached so as to prevent cold flow of the temperature sensitive material 24.

In considering this invention it should be remembered that the preceding disclosure is for illustration only and the scope of the invention should be based solely on the following claims.

I claim as my invention:

1. In damping apparatus, a housing; a sensitive instrument in said housing and supported for rotation about a rotational axis; and a damping device for damping rotations of said sensitive instrument about said axis, said damping device comprising: a first cylindrical member attached to said sensitive instrument, a second cylindrical member attached to said housing and spaced from and concentric with said first cylindrical member so as to define an annular gap, a sleeve of stress free material having a continuous surface, said material being of a polytetrafluorethylene composition, attaching means to attach said sleeve to said second cylindrical member at four equally spaced points about the periphery of said second cylindrical member, said attaching means applied so as to prevent cold flow of said material, and viscous fluid filling said annular gap, said annular gap being variable with expansion and contraction of said sleeve.

2. In damping apparatus, a housing; a sensitive instrument in said housing and supported for rotation about a rotational axis; and a damping device for damping rotations of said sensitive instrument about said axis, said damping device comprising: a first cylindrical member attached to said sensitive instrument, a second cylindrical member attached to said housing and spaced from and concentric with said first cylindrical member so as to define an annular gap, a sleeve of stress free material having a continuous surface, said material being of a polytetrafluorethylene composition, screw means to attach said sleeve to said second cylindrical member at four equally spaced points about the periphery of said second cylindrical member, said screw means applied so as to prevent cold flow of said material, and viscous fluid in said housing having a viscosity variable with temperature, said viscous fluid filling said annular gap, said annular gap being variable with expansion and contraction of said sleeve.

3. Damping apparatus for damping movements of a sensitive instrument comprising; a movable cylindrical member, a stationary cylindrical member spaced from and concentric with said movable member so as to define an annular gap, a sleeve of stress free material having a continuous surface, said material being of a polytetrafluorethylene composition, attaching means to attach said sleeve to one of said cylindrical members at four equally spaced points about the periphery of said cylindrical member, said attaching means applied so as to prevent cold flow of said material, and viscous fluid for filling said annular gap having a viscosity variable with temperature, said annular gap being variable with expansion and contraction of said sleeve.

4. In damping apparatus, mounting means; a sensitive instrument supported on said mounting means for movement with respect to said mounting means; and a damping device for damping said movement of said sensitive instrument, said damping device comprising: first means attached to said sensitive instrument, second means attached to said mounting means and spaced from said first means so as to define a gap, a sleeve of temperature sensitive material having a substantially continuous outer and inner surface, means attaching said sleeve to said second means at a plurality of equally spaced points, said inner surface of said sleeve and said second means cooperating to define a plurality of void spaces disposed between said points of attachment, and a viscous fluid filling said gap, said gap being variable with expansion and contraction of said sleeve.

5. In damping apparatus, mounting means; a sensitive instrument supported on said mounting means for movement with respect to said mounting means; and a damping device for damping said movement of said sensitive instrument, said damping device comprising: first means attached to said sensitive instrument, second means attached to said mounting means and spaced from said first means so as to define a gap, a sleeve of plastic composition material taken from the class consisting of polytetrafluorethylene and nylon, said sleeve having a substantially continuous outer and inner surface, means attaching said sleeve to said second means at a plurality of points, said inner surface of said sleeve and said second means cooperating to define a plurality of longitudinal void spaces disposed between said points of attachment, and viscous fluid filling said gap, said gap being variable with expansion and contraction of said sleeve.

6. In damping apparatus, mounting means; a sensitive instrument supported on said mounting means for rotation about a rotational axis; and a damping device for damping rotations of said sensitive instrument about said axis, said damping device comprising: first means attached to said sensitive instrument, second means attached to said mounting means and spaced from said first means so as to define an annular gap, a sleeve of temperature sensitive material having a substantially continuous outer and inner surface, means attaching said sleeve to said second means at four equally spaced points, said inner surface of said sleeve and said second means cooperating to define four longitudinal void spaces disposed between said four points of attachment, and viscous fluid means filling said annular gap, said annular gap being variable with expansion and contraction of said sleeve.

7. In damping apparatus, mounting means; a sensitive instrument supported on said mounting means for rotation about a rotational axis; and a damping device for damping rotations of said sensitive instrument about said axis, said damping device comprising; first cylindrical means attached to said sensitive instrument, second cylindrical means attached to said mounting means and spaced from and concentric with said first cylindrical means so as to define an annular gap, a sleeve of stress free material having a substantially continuous outer and inner surface, said material having a relatively high coefficient of linear thermal expansion, means attaching said sleeve to said second cylindrical means, said inner surface of said sleeve and said second cylindrical means cooperating to define a plurality of longitudinal void spaces equally disposed about the periphery of said second cylinder, and viscous fluid filling said annular gaps, said annular gap being variable with expansion and contraction of said sleeve.

8. Damping apparatus for damping movement of a sensitive instrument comprising: movable means, stationary means spaced from and concentric with said movable means so as to define a gap, a sleeve of temperature sensitive material having a substantially continuous outer and inner surface, means attaching said sleeve to said stationary means, said inner surface of said sleeve and said stationary means cooperating to define a plurality of void spaces equally disposed about the periphery of said stationary means, and viscous fluid for filling said gap, said gap being variable with expansion and contraction of said sleeve.

9. Damping apparatus for damping movements of a sensitive instrument comprising; a movable member, a stationary member spaced from and concentric with said movable member so as to define a gap, a sleeve of stress free material having a substantially continuous outer and inner surface, said material being of a polytetrafluoroethylene composition, means attaching said sleeve to said stationary means at a plurality of equally spaced points, said inner surface of said sleeve and said stationary member cooperating to define a plurality of void spaces disposed between said points of attachment about the periphery of said stationary member, and viscous fluid for filling said gap, said gap being variable with expansion and contraction of said sleeve.

References Cited in the file of this patent

UNITED STATES PATENTS

| Number | Name | Date |
| --- | --- | --- |
| 1,407,320 | Bouche | Feb. 21, 1922 |
| 2,497,921 | Ballard | Feb. 21, 1950 |
| 2,532,656 | Backus et al. | Dec. 5, 1950 |
| 2,657,454 | Huyett | Nov. 3, 1953 |
| 2,699,846 | Pitman et al. | Jan. 18, 1955 |
| 2,718,149 | Bamford et al. | Sept. 20, 1955 |
| 2,775,317 | Sinisterra | Dec. 25, 1956 |

FOREIGN PATENTS

| Number | Country | Date |
| --- | --- | --- |
| 653,869 | Great Britain | May 30, 1951 |